United States Patent [19]
Ryu

[11] 4,258,340
[45] Mar. 24, 1981

[54] AMPLITUDE EQUALIZER
[75] Inventor: Toshihiko Ryu, Tokyo, Japan
[73] Assignee: Nippon Electric Co., Ltd., Tokyo, Japan
[21] Appl. No.: 29,503
[22] Filed: Apr. 12, 1979
[30] Foreign Application Priority Data
Apr. 12, 1978 [JP] Japan .................. 53/43589
[51] Int. Cl.³ .................. H03H 7/03; H04B 3/04
[52] U.S. Cl. .................. 333/18; 328/155; 333/28 R
[58] Field of Search .............. 330/151; 333/28 R, 18
[56] References Cited
U.S. PATENT DOCUMENTS

| | | | |
|---|---|---|---|
| 2,958,831 | 11/1960 | Clark .................. | 333/28 R |
| 2,958,832 | 11/1960 | Clark .................. | 333/28 R |
| 3,667,065 | 5/1972 | Beurrier et al. .................. | 330/151 X |
| 3,671,886 | 6/1972 | Fudemoto et al. .................. | 333/18 |
| 3,725,806 | 4/1973 | Darlington .................. | 330/151 X |

*Primary Examiner*—Paul L. Gensler
*Attorney, Agent, or Firm*—Sughrue, Rothwell, Mion, Zinn and Macpeak

[57] ABSTRACT

An amplitude equalizer includes a pair of serially connected unit amplitude equalizers, each having complementary delay distortion characteristics to flatten the overall delay distortion characteristic. The unit equalizers include amplifiers or attenuators, delay circuits, and/or phase shifters. The amplitude versus frequency characteristic of the overall equalizer can be varied by controlling one or more of the attenuator/amplifiers and phase shifters. The variation can be controlled by a feedback circuit.

12 Claims, 20 Drawing Figures

AMPLITUDE EQUALIZER

The present invention relates to an amplitude equalizer for use in a signal transmission system.

Signal transmission systems require amplitude equalization in order to realize desired transmission characteristics. As an equalizer of this kind, the bridged-T attenuation equalizer (Reference is made to *DATA TRANSMISSION,* MacGraw-Hill, 1965, Chapter 15) is well known. In general, however, equalizers of this type produce more delay distortion the larger the equalizing quantity (deviation of amplitude-frequency characteristics) with the result that several more delay equalizers are needed for high-speed transmission systems than for level transmission systems. It has been almost impossible to construct a variable equalizer, although Bode's variable equalizers (Reference is made to "*On the Synthesis of the Two-Port Network in Bode's Variable Equalizer*", IEEE TRANSACTIONS ON CIRCUIT THEORY, May 1971, pp 387-390) are commonly used. One shortcoming of equalizers of this type is that the equalizable amplitude range narrows as the ratio (fractional band) of signal bandwidths to be equalized versus signal center frequencies lowers. Furthermore, the generation of delay distortion has been unavoidable.

The object of this invention is to present an amplitude equalizer which is free from the shortcomings of conventional equalizers, and which is stable, versatile and easy to adjust.

According to the present invention, there is provided an amplitude equalizer having a first input terminal for an input signal of a prefixed amplitude distortion within a predetermined frequency region, and a first output terminal, the amplitude vs. frequency characteristics of said amplitude equalizer being such that an amplitude-equalized, distortion-eliminated output signal is provided at said first output terminal: wherein a first and a second unit amplitude equalizers respectively of a first and a second delay distortion characteristics are disposed in series between said first input terminal and said first output terminal; wherein said first unit amplitude equalizer has a first means having a second input terminal, a second and a third output terminals for branching an input signal applied thereto, a second means having a fourth output terminal and a third and a fourth input terminals for synthesizing signals incoming at said third and fourth input terminals, a third means disposed between said second output terminal and said third input terminal for amplifying or attenuating a signal incoming thereto, and a fourth and a fifth means disposed in series between said third output terminal and said fourth input terminal, said fourth and fifth means being for delaying and for phase shifting, respectively; wherein said second unit amplitude equalizer has a fifth input terminal, a sixth means having a fifth and a sixth output terminals for branching a signal incoming thereto, a seventh means having a seventh output terminal and a sixth and a seventh input terminals for synthesizing signals incoming at said sixth and seventh input terminals, an eight means for connecting said fifth output terminal and said sixth input terminal, a ninth and a tenth means disposed in series between said sixth output terminal and said seventh input terminal, said ninth and tenth means being respectively for phase shifting and attenuating or amplifying signals supplied thereto; wherein said first and second delay distortion characteristics being set to complementary values to flatten the overall delay distortion characteristics of said amplitude equalizer; and wherein at least one of attenuation or amplification factor of said third and eleventh means, the delay time at each said fourth and said with means, the phase shift at each said fifth and tenth means is changed to make said amplitude vs. frequency characteristics variable.

The present invention will be explained in detail by referring to the accompanying drawings, in which.

DETAILED DESCRIPTION OF THE PREFERRED EMBODIMENTS

Figure 1:
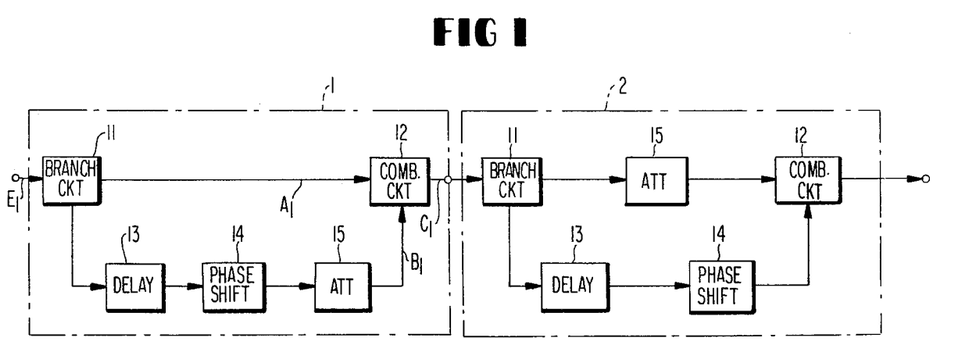
FIG. 1 shows a block diagram of one embodiment of the present invention.

In FIG. 1, reference numerals 1 and 2 show the first and second unit equalizers each having different amplitude equalizing characteristics; 11, a signal branching circuit; 12, a signal combiner; 13, a delay circuit; and 15, an attenuation circuit.

Where the delay time in delay circuit 13, phase shift in phase shift circuit 14 and attenuation factor in attenuation circuit 15 are $\tau$, $\phi$ and $\alpha$, respectively, and where input signal $E_1$ supplied by input terminal 101 is $\beta e^{j\omega t}$, output signals $A_1$ and $B_1$ at branching circuit 11 having attenuation factor $1/\beta$ and attenuation circuit 15 are given by:

$$A_1 = e^{j\omega t}$$

$$B_1 = \alpha \cdot e^{j\{\omega(t-\tau)+\phi\}}$$

Accordingly, output signal $C_1$ from the signal combiner 12 is given by:

$$C_1 = A_1 + B_1 = e^{j\omega t}\{1 + \alpha \cdot e^{-j(\omega\tau+\phi)}\}$$

Transmission characteristics (transfer function) $T_1(\omega)$ for the circuit lying between the input and output of the signal combiner 12, therefore, is given by:

$$T_1(\omega)=1+\alpha\cdot e^{-j(\omega\tau+\phi)}$$

Where the transfer functions of the amplitude, phase and delay time of unit equalizer 1 are $S_1(\omega)$, $\theta_1(\omega)$ and $D_1(\omega)$ respectively, the following equation can be obtained:

$$T_1(\omega)=S_1(\omega)\cdot e^{-j\theta_1(\omega)}$$

$$S_1(\omega) = \sqrt{1 + 2\alpha \cos(\omega\tau - \phi) + \alpha^2}$$

$$\theta_1(\omega) = -\tan^{-1}\left(\frac{\alpha \sin(\omega\tau - \phi)}{1 + \alpha \cos(\omega\tau - \phi)}\right)$$

$$D_1(\omega) = -\frac{d\theta(\omega)}{d} = \tau\cdot\alpha\left(\frac{\omega + \cos(\omega\tau - \phi)}{1 + 2\alpha\cos(\omega\tau - \phi) + \alpha^2}\right)$$

Next, transmission characteristics of unit equalizer 2 are obtained by the same methods, and where characteristic functions of the amplitude, phase and delay time are assumed to be $S_2(\omega)$, $\theta_2(\omega)$ and $D_2(\omega)$ (provided circuits 13–15 have the same functions as those of unit equalizer 1 and the same delay time, phase shift quantity and attenuation factor are given to the respective signals), the following equations will be obtained:

$$S_2(\omega) = \sqrt{1 + 2\alpha \cos(\omega\tau - \phi) + \alpha^2}$$

$$\theta_2(\omega) = -\tan^{-1}\left(\frac{\sin(\omega\tau - \phi)}{\alpha + \cos(\omega\tau - \phi)}\right)$$

$$D_2(\omega) = \tau\cdot\left(\frac{1 + \cos(\omega\tau - \phi)}{1 + 2\cos(\omega\tau - \phi) + \alpha^2}\right)$$

The following relations are seen between $S_1(\omega)$ and $S_2(\omega)$, between $\theta_1(\omega)$ and $\theta_2(\omega)$ between $D_1(\omega)$ and $D_2(\omega)$:

$$S_1(\omega)=S_2(\omega)$$

$$\theta_1(\omega)+\theta_2(\omega)=-\omega\tau+\phi$$

$$D_1(\omega) + D_2(\omega) = \frac{d}{d\omega}(\theta_1(\omega) + \theta_2(\omega)) = \tau \text{ (Constant)}$$

As is apparent from the foregoing equations, amplitude vs. frequency characteristics can be equalized with absolutely no theoretical delay distortion only by combining unit equalizers 1 and 2 in FIG. 1.

Figure 2:
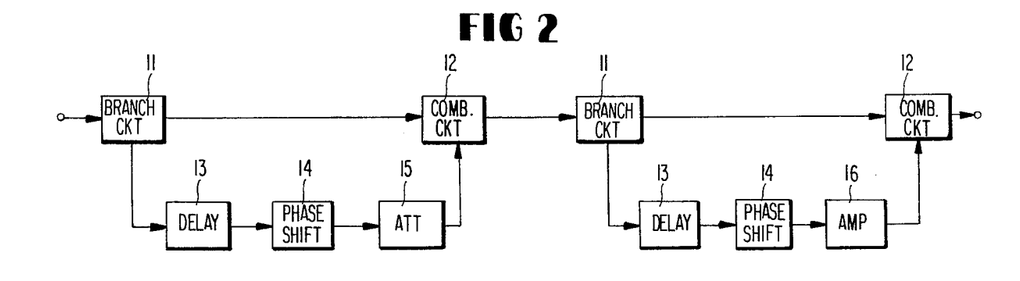
FIG. 2 shows a block diagram of the equalizer shown in FIG. 1 with a modified circuit.

FIG. 2 shows a block diagram of the equalizer modifying the circuit shown in FIG. 1. In FIG. 2, reference numeral 16 designates attenuation circuit. The exact same results as those of the construction in FIG. 1 will be obtained by giving the relations of $\alpha'=1/\alpha$ for the attenuation quantity $\alpha'$ versus $\alpha$ of attenuation circuit 15. When $\alpha<1$, then $\alpha'>1$. Accordingly, $\alpha'$ will be an amplification factor and hence attenuation circuit 16 is changed to an amplifier circuit in this instance.

As with the relations in FIGS. 1 and 2, equalizers having the same characteristics as those of the equalizer shown in FIG. 1 can be obtained even if various types of the unit equalizers 1 and 2 are combined by selecting complementary attenuation or amplification factors of the first and last-stage unit equalizers so as not to generate delay distortion.

Figure 3:
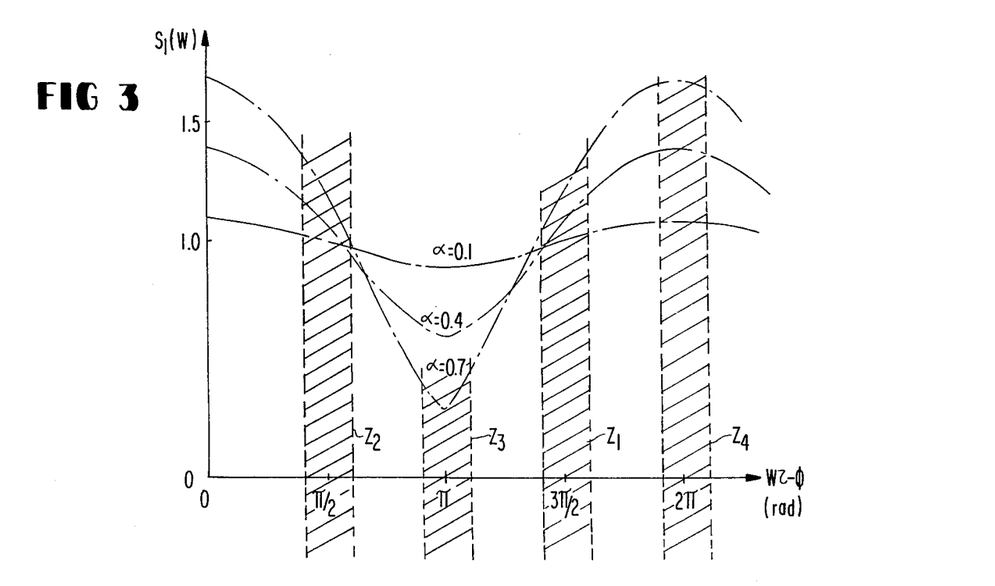
FIG. 3 shows amplitude vs. attenuation factor characteristics of the equalizer shown in FIG. 1.

FIG. 3 shows the movement of $S_1(\omega)$ ($=S_2(\omega)$) with the equalizer having the same construction as shown in FIG. 1, for the case when the value of the delay time $\tau$ is fixed and the value of $\alpha$ is to varied to 0.1, 0.4 and 0.7. In the figure, the equalizer has positive and negative linear characteristics in regions $Z_1$ and $Z_2$, respectively, and has positive and negative course of the second, or higher order in regions $Z_3$ and $Z_4$, respectively.

Figure 4:
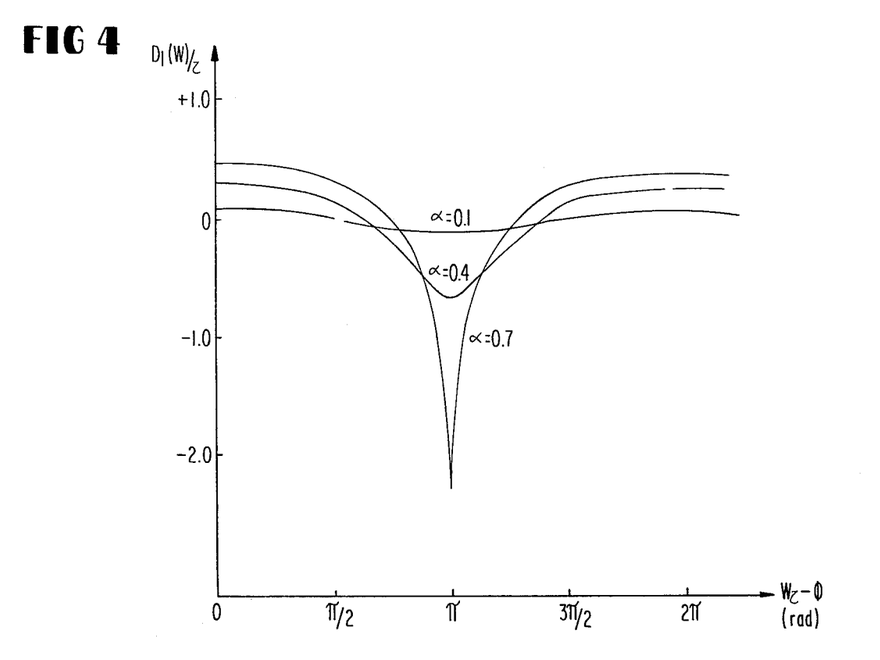
FIGS. 4 and 5 show delay distortion vs. attenuation factor characteristics of the equalizer shown in FIG. 1.
Figure 5:
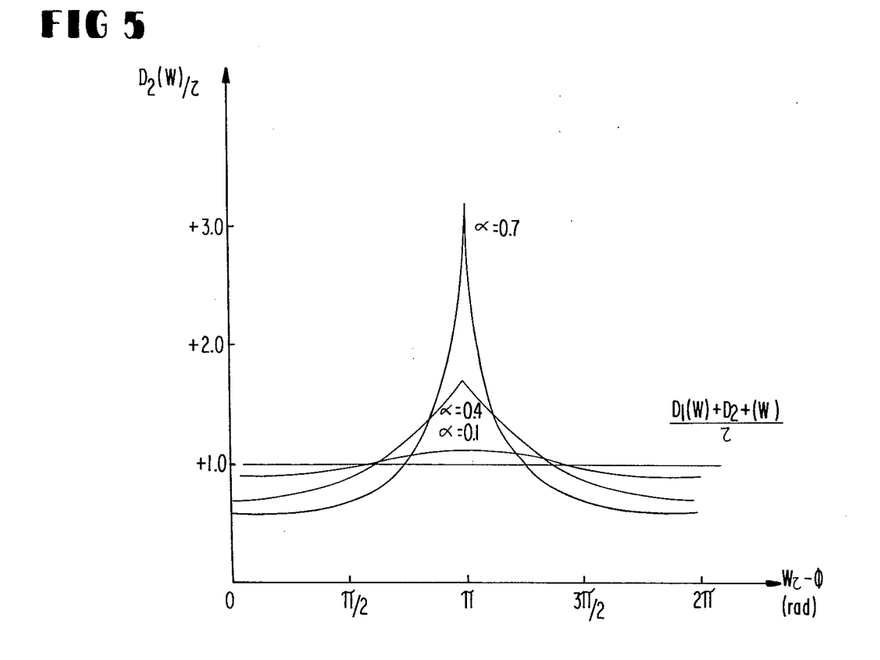

FIGS. 4 and 5 show the delay distortion $D_1(\omega)/\tau$ of equalizers 1 and 2 when $\alpha=0.1$, 0.4 and 0.7. As $\{D_1(\omega)+D_2(\omega)\}/\tau$ in FIG. 5 shows, the delay distortion is flatted when equalizers 1 and 2 are combined, and the equalizer in FIG. 1 does not cause any delay distortion at all.

Figure 6:
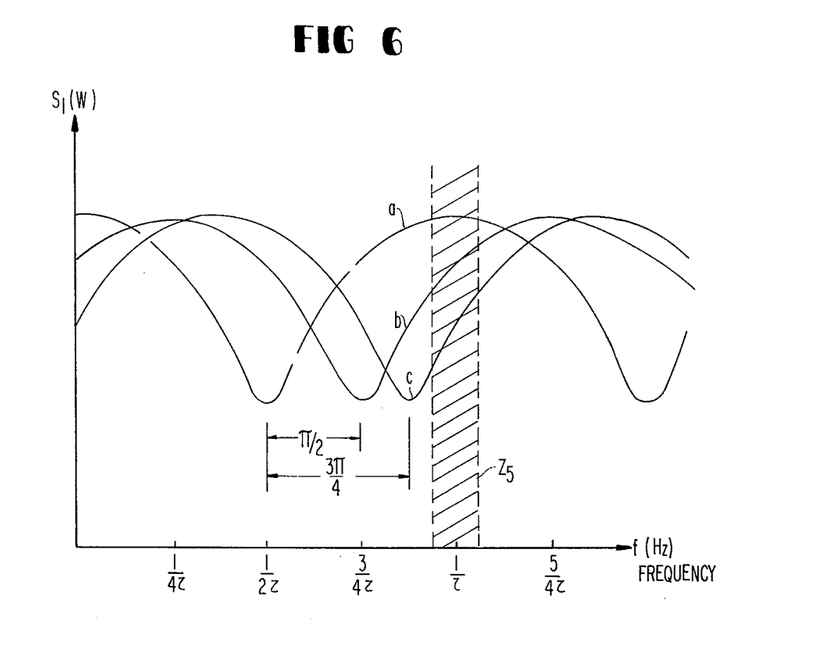
FIGS. 6 and 7 show amplitude vs. phase shift quantity characteristics of the equalizer shown in FIG. 1.

FIG. 6 shows the variation in $S_1(\omega)$ when the phase shift quantity $\phi$ is varied while the attenuation factor, or amplification factor $\alpha$, and delay time $\tau$ are kept constant. For example, by selecting the slant line region $Z_5$ (shown in the figure) as an equalizing bandwidth, characteristic a does not include equalizing characteristics of the linear distortion. By reducing the phase to $-\tau/2$ and $-3\tau/4$ relative to characteristic a, the positive linear amplitude distortion increases from characteristics b to c, while the negative linear amplitude distortion increases when the phase is reversed. In other words, this figure shows that equalizer 1, by continuously varying the phase, can vary the amplitude vs. frequency characteristics, including polarity, continuously for the linear distortion.

Figure 7:
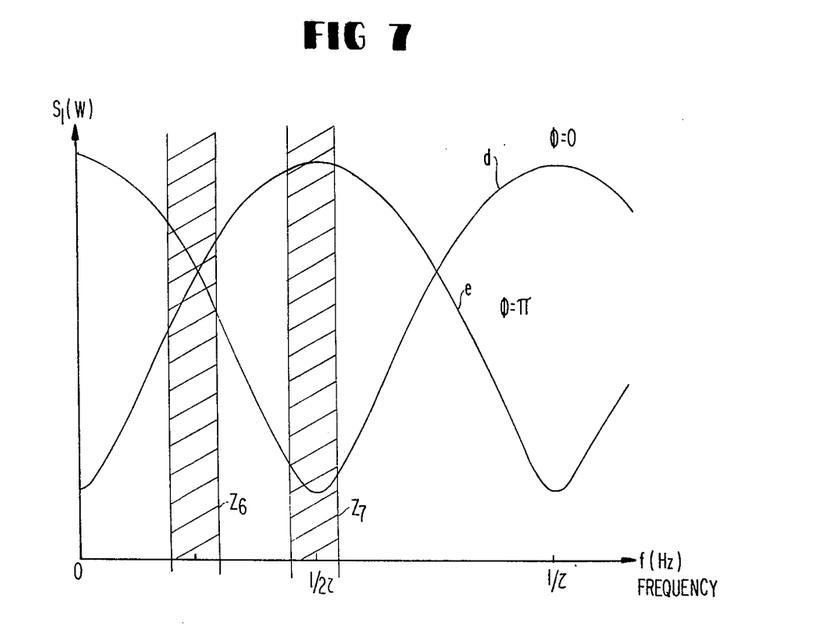

FIG. 7 shows amplitude vs. frequency characteristics $S_1(\omega)$ for the attenuation factor, or amplification factor ($\alpha$), and delay time ($\tau$) kept constant and the phase difference $\phi$ varied to 0 and $\tau$. In region $Z_6$, characteristics d and e have the polarities of their linear distortion reversed, whereas in region $Z_7$ the polarities in the secondary and higher-order distortion are reversed. Therefore, when designing an amplitude equalizer as shown in FIGS. 1 and 2, it is not absolutely necessary to give continuously variable phase transition to the signal in phase shift circuit 14. By selecting the polarity in the linear distortion, or in the distortion of the second order and by using a simple phase switch for 0 and $\pi$ only along with changing the amplitude ratio (attenuator factor, or amplification factor) $\alpha$ as shown in FIG. 3, a linear distortion equalizer including polarity, or an equalizer having distortion of the second, or higher, order can be obtained.

Figure 8:
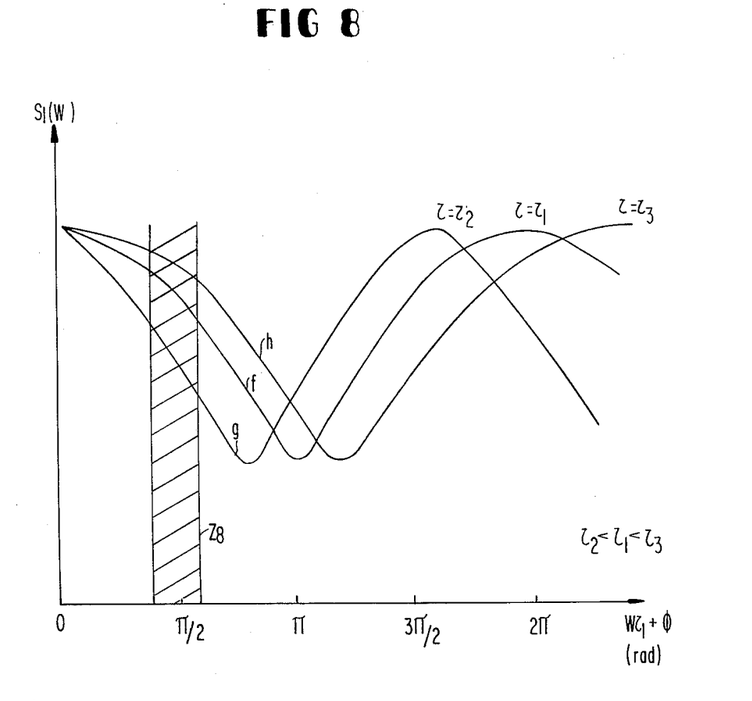
FIG. 8 shows amplitude vs. delay time characteristics of the equalizer shown in FIG. 1.

FIG. 8 shows amplitude vs. frequency characteristics, i.e., for the delay time $\tau$ varied to $\tau_2$, $\tau_1$ and to $\tau_3$ ($\tau_2<\tau_1<\tau_3$) and the attenuation factor or amplification factor $\alpha$ and phase shift quantity $\phi$ kept constant. The linear distortion decreases as $\tau$ increases to $\tau_2$, $\tau_1$, and $\tau_3$ when the slant line region $Z_8$ is selected as an equalizing bandwidth.

Figure 9:
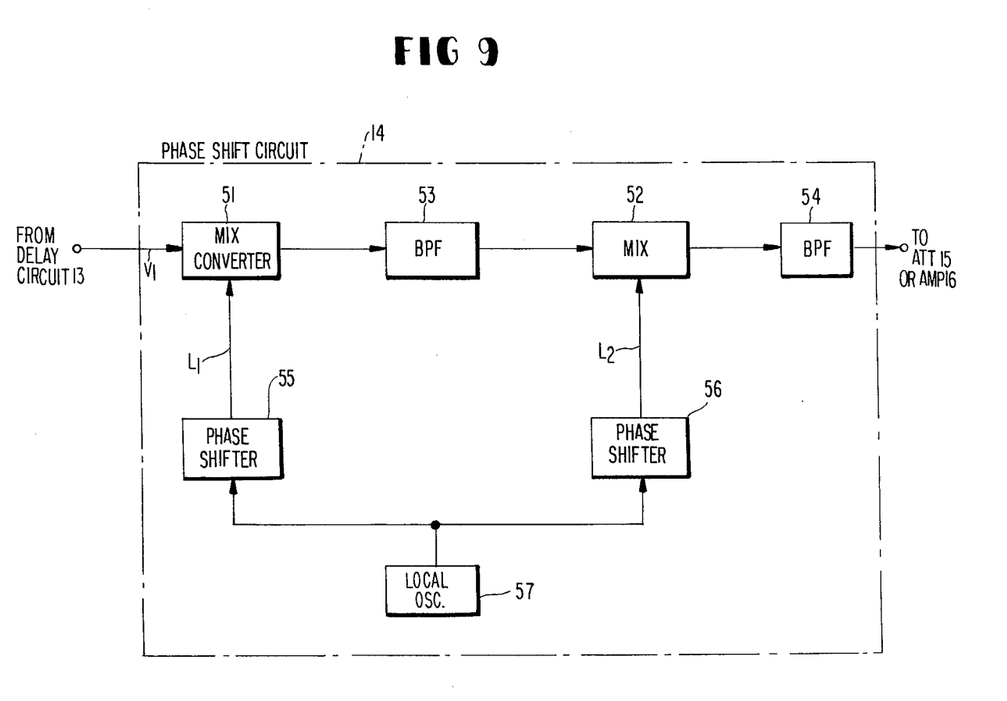
FIG. 9 shows a block diagram of an example of the phase shift circuit employed in the embodiment of the present invention.

FIG. 9 is a block diagram of a more concrete circuit of phase shift circuit 14. Reference numerals 51 and 52 designate mixers; 55 and 56, phase shifters; 53 and 54 band-pass filters; and 57, a local frequency oscillator. When the phase shift values in phase shifters 55 and 56 are $\theta_1$ and $\theta_2$, respectively, input signal fed to mixer 51 is $V_1$, and output signals of phase shifters 55 and 56 are $L_1$ and $L_2$, respectively.

$$V_1 = A \sin(\omega_1 t)$$

$$L_1 = B \sin(\omega_2 t + \theta_1)$$

$$L_2 = B \sin(\omega_2 t + \theta_2)$$

The following equation is obtained by mixing the input signal $V_1$ and the local oscillation $L_1$ in mixer 51:

$$V_1 \times L_1 = AB\sin \omega_1 t \cdot \sin(\omega_2 t + \theta_1)$$
$$= \tfrac{1}{2} AB[\cos\{(\omega_2 - \omega_1)t + \theta_1\} + \cos\{(\omega_2 + \omega_1)t + \theta_1\}]$$

For example, by selecting the first term (lower side band) in the above equation with band-pass filter 53 and by mixing with local signal $L_2$:

$$\tfrac{1}{2} AB [\cos\{(\omega_2 - \omega_1)t + \theta\}] \cdot B \sin(\omega_2 t + \theta_2) =$$
$$\tfrac{1}{4} A \cdot B^2 [\sin\{\omega_1 t + (\theta_2 - \theta_1)\} + \sin\{(2\omega_2 - \omega_1)t + (\theta_1 \theta_2)\}]$$

Furthermore, by outputting the first term in the above equation by using band-pass filter 54, the difference in phase shift quantities $(\theta_2 - \theta_1)$ in phase shifters 55 and 56 is given to signal $V_1$. A fixed phase transition can be given to broadband signals by using circuit 14.

Figure 10:
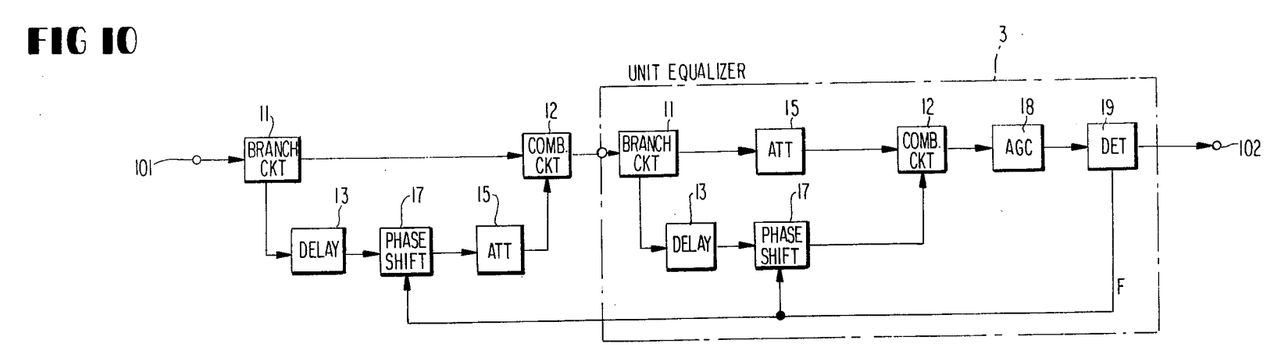
FIGS. 10 and 11 show block diagrams of further embodiments of the present invention.

FIG. 10 is another application example of a block diagram of an amplitude equalizer according to the present invention. Reference numeral 3 denotes a unit equalizer; 17, an automatic phase shift circuit (will be discussed later); 18, an automatic gain control circuit (hereinafter referred to as AGC); and 19, a phase-shift control circuit. The circuit 19 detects amplitude vs. frequency characteristics of the input signal component (power spectrum) within signal bands and controls the phase shift quantity of automatic phase shift circuit 17. Nothing changes compared with the amplitude equalizer shown in FIG. 1 except for the automatic control of the phase shift quantity by automatic phase shift circuit 19. Consequently, the same theoretical analysis of the circuit shown in FIG. 1 applies to the equalizer shown in FIG. 10. Its characteristic functions of attenuation factor, or amplification factor, phase quantity and delay time are the same as those shown in FIGS. 3 through 8.

Figure 11:
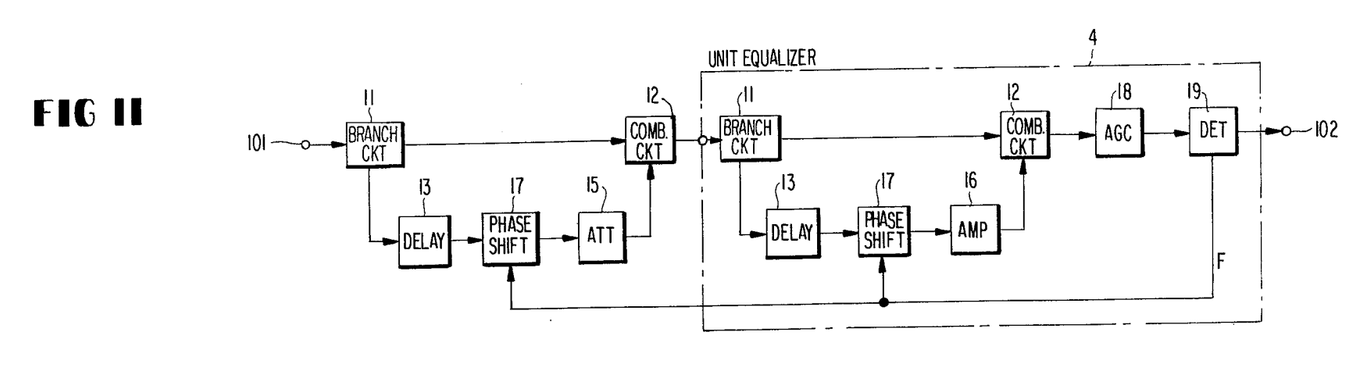

FIG. 11 is a block diagram of another example of an amplitude equalizer according to the present invention. Reference numeral 4 denotes a unit amplitude equalizer. The equalizer in FIG. 11 is inversely related to the attenuation factor or amplification factor of circuit 16 and the attenuation factor or amplification factor of circuit 15 in that their relations are expressed by an inverse number. This was the case with the equalizers in FIGS. 1 and 2. The same results as those of the equalizer in FIG. 10 were obtained. The same results as those in the equalizer shown in FIG. 1 can be obtained with other combinations using unit equalizers 3 and 4.

The equalizers in FIGS. 10 and 11 will be described further with regard to FIG. 6. It shows the movement of $S_1(\omega)$ when the phase shift quantity $\phi$ is changed while the attenuation factor or amplification factor $\alpha$ and delay time $\tau$ remain constant. There will be no linear amplitude distortion for characteristic a in the figure when, for example, the slant line region $Z_5$ in FIG. 6 is selected as an equalizing bandwidth. When the phase is reduced from $-\pi/2$ to $-3\pi/4$, compared with characteristic a, the positive linear distortion increases from characteristics b to c. By inversely increasing the phase, the negative linear distortion increases. This shows that the amplitude vs. frequency characteristics can be varied continuously by the linear amplitude distortion, including the polarity, by continuously varying the phase. Therefore, by detecting the polarity and magnitude of the linear distortion of the amplitude vs. frequency characteristics generated on the transmission line (based on the distortion on the power spectrum of the receiving signal in control circuit 19), and by controlling the phase of phase shift circuit 17 in order to cancel this linear distortion, a negative feedback circuit can be structured and amplitude vs. frequency characteristics through the transmission line can be kept flat.

Figure 12:
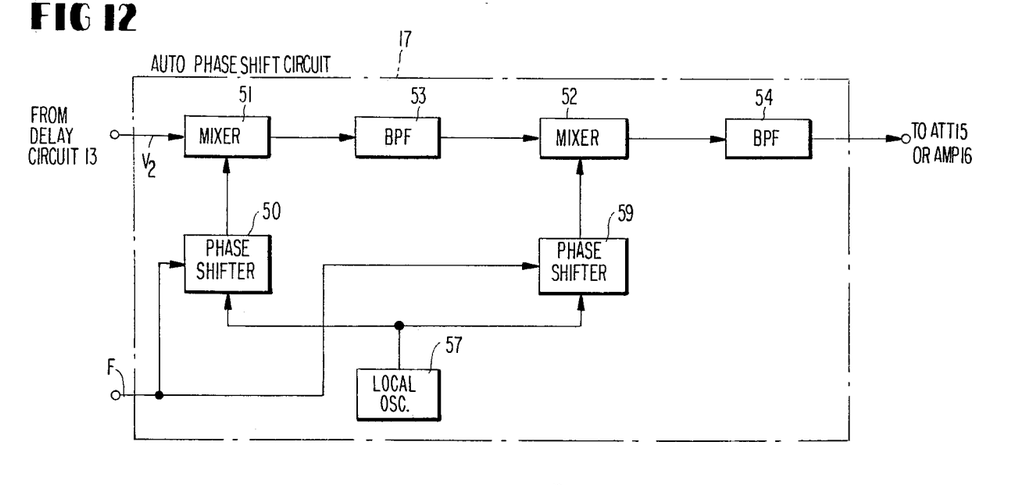
FIG. 12 shows a block diagram of an example of the automatic phase shift circuit employed in the embodiments.

FIG. 12 shows a block diagram of a more concrete circuit of automatic phase shift circuit 17. Reference numerals 58 and 59 denote automatic phase shifters and F indicates a control signal from control circuit 19. The circuit is the same construction as phase shift circuit 14 in FIG. 9 except that the phase shift can be changed automatically by control circuit 19. When the phase shift in phase shifters 58 and 59 are $\theta_1$ and $\theta_2$, the same analytic results as those for the circuit in FIG. 9 can be obtained. The phase shift quantity of input signal $V_2$ to mixer 51 will be the same.

Figure 13:
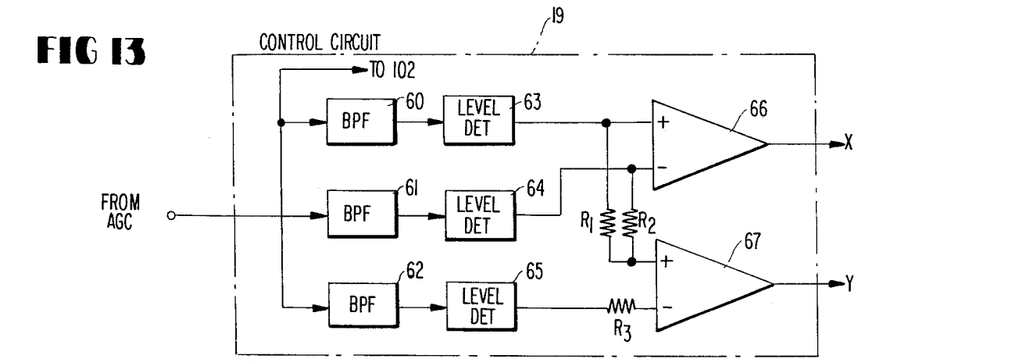
FIG. 13 shows a block diagram of an example of the control circuit employed in the embodiments.
Figure 14:
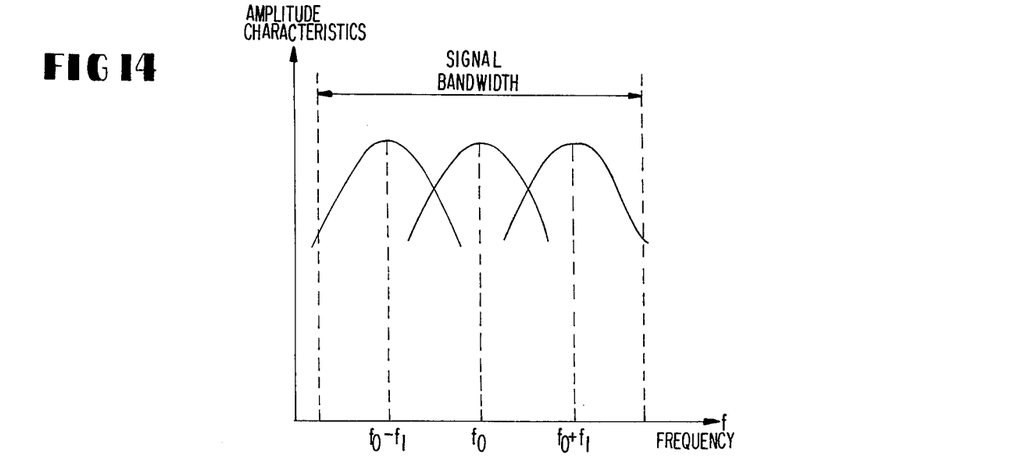
FIG. 14 is a characteristic diagram of the circuit shown in FIG. 13.

FIG. 13 is a block diagram of a more concrete circuit of control circuit 19. Reference numerals 60 to 62 denote narrow band-pass filters having center frequencies $(f_0+f_1)$, $(f_o-f_1)$ and $f_o$ ($f_o$ is the center frequency of the frequency band occupied by the signal and $f_1$ an appropriate frequency). Reference numerals 63 to 65 denote level detectors; and 66 and 67, differential amplifiers. FIG. 14 shows amplitude vs. frequency characteristics of filters 60 to 62. Differential amplifier 66 compares the output of level detectors 63 and 64, [signal components on both lower and higher frequency sides of $f_0$] takes out the difference between the two and outputs X according to the linear amplitude distortion and its polarity. Differential amplifier 67, on the other hand, compares the average output of level detectors 63 and 64 and the output of level detector 65 (signal components near $f_0$), and takes out the difference between the two. Then output Y is made according to the distortions and polarities of the second and higher orders. Filter 62, detector 65, resistors $R_1$ and $R_3$ and differential amplifier 67 are not needed when equalizing only the linear amplitude distortion, and differential amplifier 66 is not necessary when equalizing distortion of the second and higher orders. Output signals X and Y of differential amplifiers 66 and 67 respectively, are selectively supplied to the circuits to be controlled.

Figure 15:
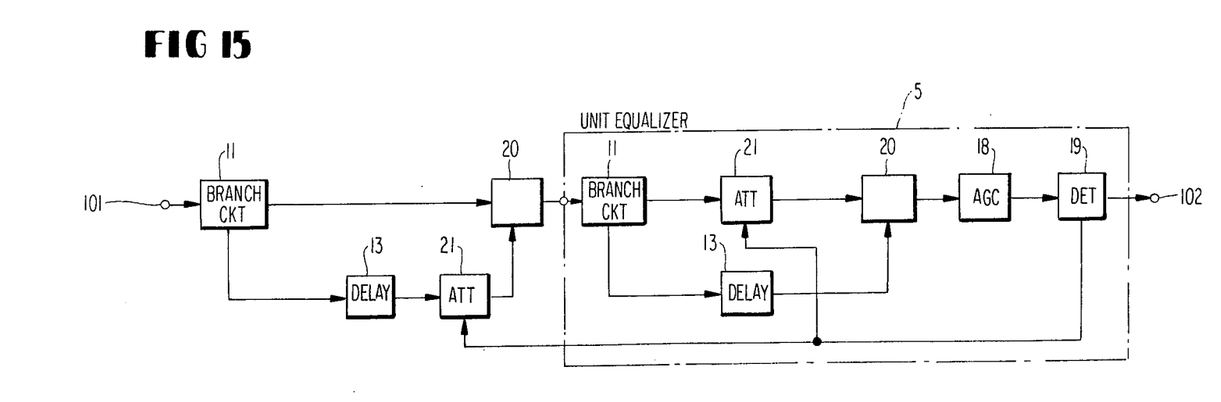
FIGS. 15 through 18 show block diagrams of further embodiments of the present invention.

FIG. 15 is a block diagram of another example of the amplitude equalizer according to the present invention. Reference numeral 20 denotes a circuit for taking the sum or difference regarding signal synthesis; and 21 and 22, automatic attenuation circuits. The theoretical analysis of the equalizer in FIG. 15 is the same as that for the equalizer in FIG. 1. However, when there is no phase shift circuit, $\phi=0$ or $\phi=\pi$ has to be present for the phase difference $\phi$ corresponding to the sum or difference of signals in combining circuit 20. The characteristic functions of attenuation factor, or amplification factor, and delay time are the same as the characteristic diagrams in FIGS. 3 to 5, 7 and 8.

Figure 16:
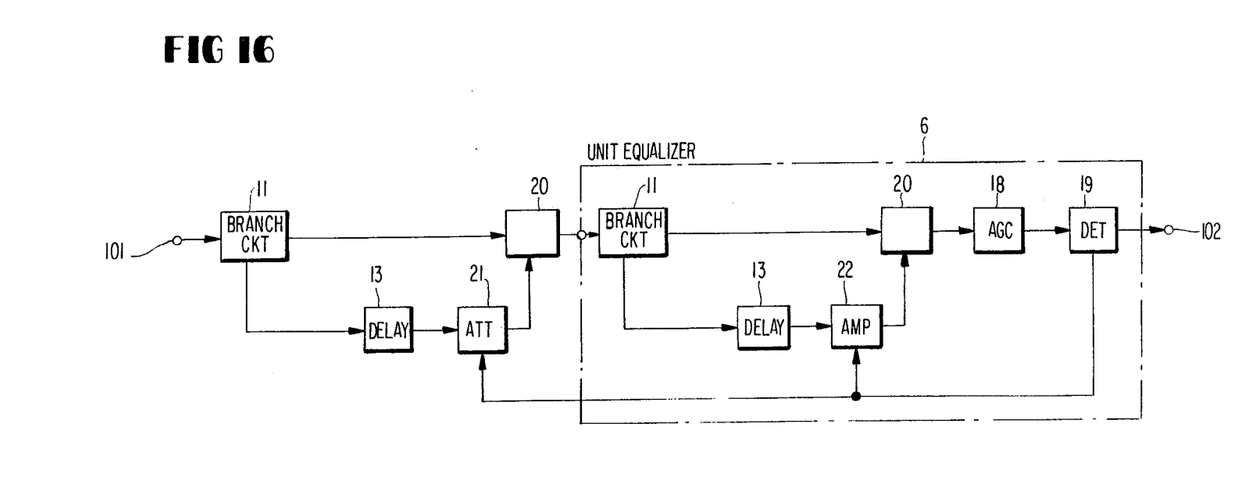

FIG. 16 is a block diagram of still another example of the amplitude equalizer according to the present invention. The relations between the equalizers in FIGS. 16 and 15 are the same as those for the equalizers in FIGS. 1 and 2, and the same characteristics have been obtained by adjusting the attenuation factor or amplification factor. As with FIGS. 1 and 2, the same effects can be obtained by other combinations using unit equalizers 5 and 6.

The equalizers in FIGS. 15 and 16 are explained further in FIG. 7. It shows amplitude vs. frequency characteristics $S_1(\omega)$ when the phase difference is changed to 0 and $\pi$ while the attenuation factor, or amplification factor $\alpha$, and delay time $(\tau)$ remain constant (equivalent in value by taking the sum of, or difference between the signals). In region $Z_6$ shown in FIG. 7, characteristics a and b have the polarities of their linear distortions reversed. In region $Z_7$, the polarities of the second and higher order distortions are reversed. Therefore, if the distortion character of the amplitude vs. frequency characteristics generated in the transmission line can be determined in advance (e.g., the polarity of the linear distortion is positive), various amplitude equalizers can be designed. This is done by setting the delay time difference ($\tau$) in the equalizers in FIGS. 15 and 16, and the sum or difference of signals in the synthesis circuit 20 as required. In other words, amplitude vs. frequency characteristics can be automatically maintained flat by detecting the linear amplitude distortion generated in the transmission lines of the equalizers in FIGS. 15 and 16 and reducing this distortion by controlling attenuation circuit 21 or 22. As a circuit in concrete terms for synthesizing circuit 20, a hybrid transformer, etc. can be used with a signal sum, while a differential amplifier, etc. can be used with a signal difference.

The same control circuit as shown in FIG. 13 can be used as control circuit 19.

Figure 17:
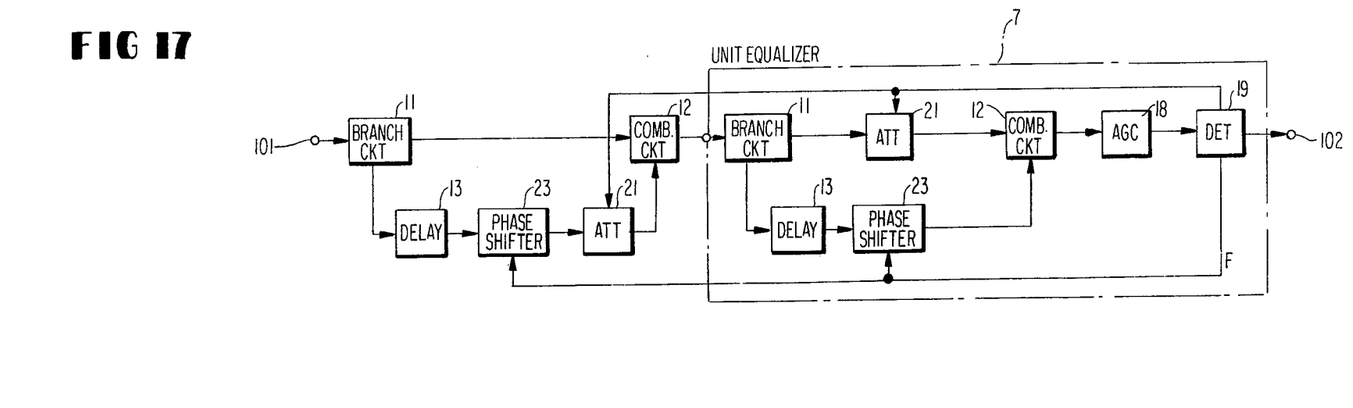

FIG. 17 is a block diagram of another application example of the amplitude equalizer according to the present invention. Reference numeral 7 denotes a unit equalizer; and 23, an automatic phase shift circuit. The theoretical analysis of the equalizer in FIG. 17 is the same as that for the equalizer in FIG. 1. The only difference is that, in the construction, the phase shift quantity $\phi$ and attenuation factor or amplification factor $\alpha$, are automatically controlled by control circuit 19.

Figure 18:
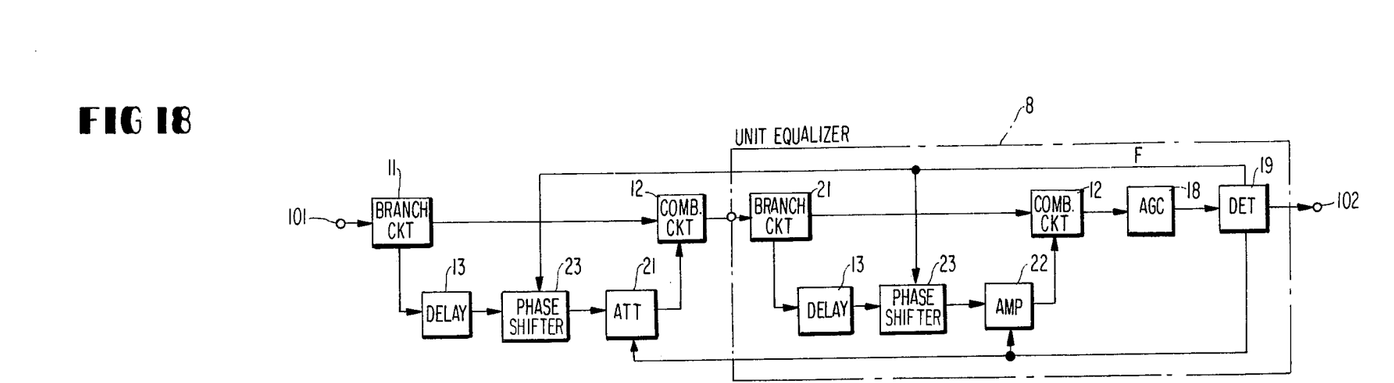

FIG. 18 shows a block diagram of still another example of the amplitude equalizer according to the present invention. Reference numeral 8 denotes a unit equalizer. The relation between the equalizers in FIGS. 17 and 18 are the same as those for the equalizers shown in FIGS. 1 and 2. As with the equalizers in FIGS. 1 and 2, various equalizers can be constructed by changing combinations of unit equalizers 7 and 8.

The characteristic functions of the attenuation factor or amplification factor, phase quantity, and delay time of the amplitude equalizers in FIGS. 17 and 18 are the same as those in the characteristic diagrams in FIGS. 3 to 8. The equalizers shown in FIGS. 17 and 18 will be explained further in FIG. 7. It shows amplitude vs. frequency characteristics $S_1(\omega)$ when the attenuation factor or amplification factor $\alpha$, and delay time $\tau$ are constant and the phase difference is varied to 0 and $\pi$. In region $Z_6$ shown in FIG. 7, the polarities of the linear distortion for characteristics d and e are inverse, whereas in region $Z_7$, the polarities of the distortion of the second, or higher, order are inverse. This means that, when designing an automatic equalizer as shown in FIGS. 17 and 18, continuous variable phase transition does not necessarily have to be given to the signal in phase shift circuit 23. An equalizer for linear distortion including polarity, or an equalizer for second or higher order distortions, can be obtained by selecting polarities of linear distortion, or of secondary, or higher order distortions. This is done by using a simple phase switch for 0 and $\pi$ only, and by varying the amplitude ratio (attenuation factor or amplification factor) $\alpha$ as shown in FIG. 3.

Figure 19:
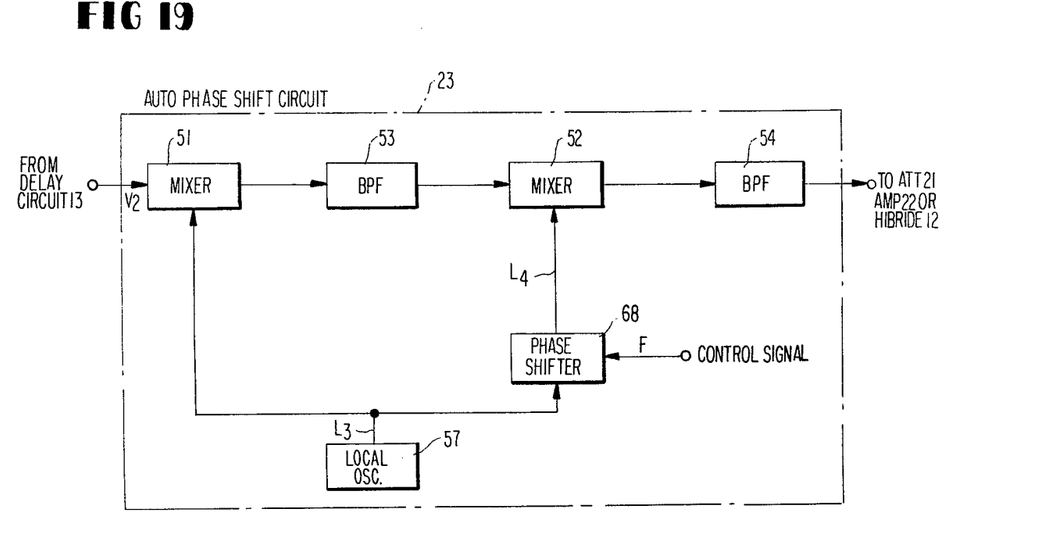
FIG. 19 is a block diagram of another example of the automatic phase shift circuit employed in the embodiments invention.

FIG. 19 is a block diagram of a more concrete circuit for automatic phase shift circuit 23. Reference numeral 68 denotes the automatic phase shifter. When the phase shift of the automatic phase shifter is $\theta$, input signal fed to mixer 51 is $V_2$, output signal of the local oscillator 56 is $L_3$, the output signal of the automatic phase shifter is $L_4$, and where $$V_2 = A \sin \omega_1 t$$

$$L_3 = B \sin \omega_2 t$$

$$L_4 = B \sin (\omega_2 t + \theta)$$

the following equation is obtained:

$$\begin{aligned}V_2 \times L_3 &= AB \sin\omega_1 t \sin\omega_2 t \\ &= \tfrac{1}{2} AB \{\cos (\omega_2 - \omega_1)t - \cos (\omega_2 + \omega_1)t\}\end{aligned}$$

by mixing input signal $V_2$ and local oscillation $L_3$ in mixer 51. For example, by selecting the first term (lower side band) in the above equation using filter 53 and by mixing it with local oscillation $L_4$:

$$\tfrac{1}{2} AB \cos \{(\omega_2 - \omega_1)t\} \cdot B \sin (\omega_2 t + \theta) = \\ \tfrac{1}{4} AB^2 [\sin (\omega_1 t + \theta) + \sin (2\omega_2 - \omega_1)t + \theta)]$$

By taking out the first term in the above equation, the phase shift $\theta$ in automatic phase shifter 68 is given to signal $V_2$ as it is. A certain phase shift can be given to broadband signals by using circuit 23.

Figure 20:
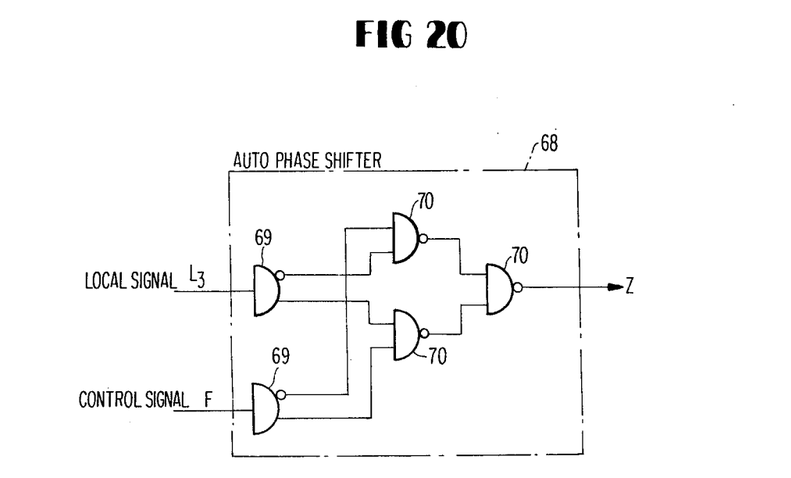
FIG. 20 is a diagram of an example of the automatic phase shifter employed in the circuit shown in FIG. 19.

FIG. 20 is a more concrete circuit diagram for automatic phase shifter 68. Reference numeral 69 denotes a gate circuit for providing positive an inverse phases of an input signal; and 70, a NAND circuit. This phase shifter is a phase switch (0 and $\pi$) with a simple digital circuit. Assuming the oscillation output of local oscillator 56 to be $L_3$; control signal, F; and output signal, Z; a local oscillation, whose phase has changed by $\pi$ only, will be obtained at the output Z when control signal F is a digital signal '0' or '1'. An automatic equalizer that can be used with linear distortions or secondary and higher order distortions can be obtained by varying $\theta$ to 0, $\pi/2$, $\pi$, and $3\pi/2$. The circuit shown in FIG. 13 can be used with control circuit 19.

All the amplitude equalizers stated above are structured by combining unit equalizers 1 to 8. The foregoing explanations show that the unit equalizers 1 to 8 independently operate as an amplitude equalizer. Furthermore, an amplitude equalizer with a larger equalizing amplitude can be obtained by combining an n (n: positive integer) number of combinations consisting of two unit equalizers (i.e., unit equalizers in 2n number) aside from a unit equalizer, and an equalizer combining two unit equalizers. An equalizer capable of equalizing amplitude characteristics of linear distortions and secondary distortions at the same time can be obtained by using the circuit shown in FIG. 13 as a control circuit for an equalizer combining a plural number (2n) and by supplying output signals X and Y of differential amplifiers 66 and 67 to an equalizer that equalizes the characteristics of the linear and secondary order distortions.

The present invention permits a design of an amplitude equalizer that can have a specific frequency region and maximum equalizing amplitude by appropriately selecting the attenuation factor or amplification factor ($\alpha$), phase shift quantity ($\Phi$) and delay time ($\tau$). This invention allows the addition of an automatic amplitude equalizer capable of automatically selecting the equalizing region and equalizing the characteristics as needed. Further, by combining unit equalizers and appropriately adjusting the attenuation factor or amplification factor, an amplitude equalizer with flat delay distortion characteristics, large equalizing amplitude and that can simultaneously equalize amplitude characteristics of linear and second or higher order distortions can be obtained.

What is claimed is:

1. An amplitude equalizer having a first input terminal for an input signal of a prefixed amplitude distortion within a predetermined frequency region, and a first output terminal, the amplitude vs. frequency characteristics of said amplitude equalizer being such that an amplitude equalized, distortion-eliminated output signal is provided at said first output terminal: wherein first and second unit amplitude equalizers respectively of first and second delay distortion characteristics are disposed in series between said first input terminal and said first output terminal; wherein said first unit amplitude equalizer has a first means having a second input terminal, second and third output terminals for branching an input signal applied thereto, a second means having a fourth output terminal and third and fourth input terminals for combining signals incoming at said third and fourth input terminals, a third means disposed between said second output terminal and said third input terminal for amplifying or attenuating a signal incoming thereto, and a fourth and a fifth means disposed in series between said third output terminal and said fourth input terminal, said fourth and fifth means being for delaying and for phase shifting, respectively; wherein said second unit amplitude equalizer has a sixth means having a fifth input terminal and a fifth and a sixth output terminals for branching a signal incoming thereto, a seventh means having a seventh output terminal and a sixth and a seventh input terminals for combining signals incoming at said sixth and seventh input terminals, an eight means for connecting said fifth output terminal and said sixth input terminal, a ninth, tenth and eleventh means disposed in series between said sixth output terminal and said seventh input terminal, said ninth, tenth and eleventh means being respectively for delaying, phase shifting and attenuating or amplifying signals supplied thereto; wherein said first and second delay distortion characteristics being set to complementary values to flatten the overall delay distortion characteristics of said amplitude equalizer; and wherein at least one of attenuation or amplification factor of said third and eleventh means, the delay time at each said fourth and said ninth means, the phase shift each said fifth and tenth means is changed to make said amplitude vs. frequency characteristics variable.

2. An amplitude equalizer having a first input terminal for an input signal of a prefixed amplitude distortion within a predetermined frequency region, and a first output terminal, the amplitude vs. frequency characteristics of said amplitude equalizer being such that an amplitude-equalized, distortion-eliminated output signal is provided at said first output terminal: wherein first and second unit amplitude equalizers respectively of first and second delay distortion characteristics are disposed in series between said first input terminal and said first output terminal; wherein said first unit amplitude equalizer has a first means having a second input terminal, second and third output terminals for branching an input signal applied thereto, a second means having a fourth output terminal and third and fourth input terminals for combining signals incoming at said third and fourth input terminals, means for connecting said second output terminal to said third input terminal, and a third, fourth, fifth means disposed in series between said third output terminal and said fourth input terminal, said third, fourth and fifth means being for amplifying or attenuating, for delaying and for phase shifting, respectively; wherein said second unit amplitude equalizer has a sixth means having a fifth input terminal and a fifth and a sixth output terminal for branching a signal incoming thereto, a seventh means having a seventh output terminal and a sixth and a seventh input terminals, for combining signals incoming at said sixth and seventh input terminals, an eight means for connecting said fifth output terminal and said sixth input terminal, a ninth, tenth and eleventh means disposed in series between said sixth output terminal and said seventh input terminal, said ninth tenth and eleventh means being respectively for delaying, phase shifting and attenuating or amplifying signals supplied thereto; wherein said first and second delay distortion characteristics being set to complementary values to flatten the overall delay distortion characteristics of said amplitude equalizer; and wherein at least one of attenuation or amplification factor of said third and eleventh means, the delay time at each said fourth and said ninth means, the phase shift at each said fifth and tenth means is changed to make said amplitude vs. frequency characteristics variable.

3. The amplitude equalizer as claimed in any of claims 1 or 2, wherein each of said fifth and tenth means comprises: a local oscillator; first and second phase shifters for giving first and second phase shift to the output signal of said local oscillator, respectively; a first frequency converter for converting frequency of the input signals fed to each of said fifth and tenth means with the output signals of said first phase shifter; a first bandpass filter for filtering the output of said first frequency converter; a second frequency converter for converting the output frequency of said first band-pass filter with the output signals of said second phase shifter; and a second band-pass filter for filtering the output of said second frequency converter and changing the output signals into output signal of each of fifth and tenth means.

4. An amplitude equalizer having a first input terminal for receiving signals having amplitude distortion characteristics in a fixed frequency band, a first output terminal, and amplitude vs. frequency characteristics for equalizing said amplitude distortion characteristics, characterized by comprising first and second amplitude equalizing means having first and second delay distortion characteristics, respectively and disposed serially between said first input terminal and first output terminal, and a first means connected to said first output terminal for detecting said amplitude distortion characteristics and providing control signals corresponding to this detection, said first amplitude equalizing means comprising: a second means having a second input terminal, second and third output terminals for splitting signals applied thereto; a third means having a fourth output terminal, third and fourth input terminals, for combining signals applied thereto; a fourth means provided between said second output terminal and third input terminal for attenuating or amplifying signals therethrough; and a fifth means disposed between said third output terminal and fourth input terminal for delaying signals therethrough; and said second amplitude equalizing means comprising: a sixth means having a fifth input terminal, fifth and sixth output terminals for splitting signals applied thereto; a seventh means having a seventh output terminal, sixth and seventh input terminals for combining signals applied thereto; an eight means for connecting said fifth signal output terminal and sixth input terminal; ninth and tenth means provided serially between said sixth output terminal and seventh input terminal for delaying and attenuating or amplifying signals therethrough, respectively, and characterized by complementarily setting said first and second delay distortion characteristics so that said delay distortion characteristics of said amplitude equalizer is flat, and by the ability to vary said amplitude vs. frequency characteristics by changing the attenuation factors or amplification factors of said fourth and tenth means, respectively, by means of said control signals.

5. An amplitude equalizer having a first input terminal for receiving signals having amplitude distortion characteristics in a fixed frequency band, a first output terminal, and amplitude vs. frequency characteristics for equalizing said amplitude distortion characteristics, characterized by comprising first and second amplitude equalizing means having first and second delay distortion characteristics, respectively and disposed serially between said first input terminal and first output terminal, and a first means connected to said first output terminal for detecting said amplitude distortion characteristics and providing control signals corresponding to this detection, said first amplitude equalizing means comprising: a second means having a second input terminal, second and third output terminals for splitting signals applied thereto; a third means having a fourth output terminal, a third and fourth input terminals, for combining signals applied thereto; means connecting said second output terminal to said third input terminal; and a fourth and fifth means disposed in series between said third output terminal and a fourth input terminal for amplifying or attenuating and for delaying signals therethrough, respectively; and said second amplitude equalizing means comprising: a sixth means having a fifth input terminal, fifth and sixth output terminals for splitting signals applied thereto; a seventh means having a seventh output terminal, sixth and seventh input terminals for combining signals applied thereto; an eighth means for connecting said fifth signal output terminal and sixth input terminal; ninth and tenth means provided serially between said sixth output terminal and seventh input terminal for delaying and attenuating or amplifying signals therethrough, respectively, and characterized by complementarily setting said first and second delay distortion characteristics so that said delay distortion characteristics of said amplitude equalizer is flat, and by the ability to vary said amplitude vs. frequency characteristics by changing the attenuation factors or amplification factors of said fourth and tenth means, respectively, by means of said control signals.

6. The amplitude equalizer claimed in any of claims 4 or 5, wherein said first means comprises; first, second and third band-pass filters for passing high, low and intermediate frequency components in the frequency bands of said amplitude distortion characteristics to be equalized, respectively; first, second and third level detectors connected to the first, second and third bandpass filters, respectively; a first operational amplifier for comparing the output level of said first level detector with that of said second level detector to produce a first amplified output; and a second operational amplifier for comparing the average level between output levels of said first level detector and said second level detector with the output level of said third level detector to produce a second amplified signal, whereby said first and second amplified signals are selectively transmitted as said control signals according to the amplitude distortion characteristics to be equalized.

7. An amplitude equalizer having a first input terminal for receiving signals having amplitude distortion characteristics in a fixed frequency band, a first signal output terminal, and an amplitude vs. frequency characteristic for equalizing the amplitude distortion characteristics, characterized by comprising first and second amplitude equalizing means having first and second delay distortion characteristics, respectively, serially between said first input terminal and first output terminal and a first means connected to said first output terminal for detecting said amplitude distortion characteristics and providing control signals according to this detection, said first amplitude equalizing means comprising: second means having a second input terminal, second and third output terminals for splitting signals applied thereto; a third means having a fourth output terminal, third and fourth input terminals for combining signals applied thereto; a fourth means provided between said second output terminal and third input terminal for attenuating or amplifying signals therethrough; and fifth and sixth means provided serially between said third output terminal and fourth input terminal for delaying and phase-shifting signals therethrough, respectively, and said second amplitude equalizer comprising; a seventh means having a fifth input terminal, fifth and sixth output terminals for splitting signals applied thereto; an eight means having a seventh output terminal, sixth and seventh input terminals for combining signals applied thereto; a ninth means for connecting said fifth output terminal and sixth signal input terminal; and tenth, eleventh and twelfth means disposed serially between said sixth output terminal and seventh input terminal for delaying, phase-shifting and attenuating or amplifying signals therethrough, respectively; and characterized by complementarily setting said first and second delay distortion characteristics so that said delay distortion characteristics of the amplitude equalizer is flat, and by the ability to vary the amplitude vs. frequency characteristics by changing, through said control signals, at least one of attenuation factors or amplification factors of said fourth and twelfth means and phase shift quantities of said sixth and eleventh means.

8. An amplitude equalizer having a first input terminal for receiving signals having amplitude distortion characteristics in a fixed frequency band, a first signal output terminal, and an amplitude vs. frequency characteristic for equalizing the amplitude distortion characteristics, characterized by comprising first and second amplitude equalizing means having first and second delay distortion characteristics, respectively, serially between said first input terminal and first output terminal, and a first means connected to said first output terminal for detecting said amplitude distortion characteristics and providing control signals according to this detection, said first amplitude equalizing means comprising: second means having a second input terminal, second and third output terminals for splitting signals applied thereto; a third means having a fourth output terminal, third and fourth input terminals for combining signals applied thereto; means for connecting said second output terminal to said third input terminal and fourth, fifth and sixth means provided serially between said third output terminal and fourth input terminal for amplifying or attenuating for delaying and phase-shifting signals therethrough, respectively, and said second amplitude equalizer comprising; a seventh means having a fifth input terminal, fifth and sixth output terminals for splitting signals applied thereto; an eighth means having a seventh output terminal, sixth and seventh input terminals for combining signals applied thereto; a ninth means for connecting said fifth output terminal and sixth signal input terminal; and tenth, eleventh and twelfth means disposed serially between said sixth output terminal and seventh input terminal for delaying, phase-shifting and attenuating or amplifying signals therethrough, respectively; and characterized by complementarily setting said first and second delay distortion characteristics so that said delay distortion characteristics of the amplitude equalizer is flat, and by the ability to vary the amplitude vs. frequency characteristics by changing, through said control signals, at least one of attentuation factors or amplification factors of said fourth and twelfth means and phase shift quantities of said sixth and eleventh means.

9. The amplitude equalizer claimed in any of claims 7 or 8, wherein said first means comprises; first, second, and third band-pass filters for passing high, low and intermediate frequency components in frequency bands of said amplitude distortion characteristics to be equalized, respectively; first, second and third level detectors connected to said first, second and third band-pass filters, respectively; a first operational amplifier for comparing the output level of said first level detector with that of said second level detector to produce a first amplified signal; and a second operational amplifier for comparing the average level between output levels of said first level detector and said second level detector with the output level of said third level detector to produce a second amplified signal whereby said first and second amplified signals are selectively transmitted as said control signal according to said amplitude distortion characteristics to be equalized.

10. The amplitude equalizer claimed in claim 7, wherein each of said sixth and eleventh means comprises; a first local frequency oscillator; first and second phase shifters for providing first and second phase shift determined by said control signals, to the output signal of said first local frequency oscillator, respectively; a first frequency converter for converting the frequency of the input signals applied to each of said sixth and eleventh means by using the output signals of said first phase shifter; a first band-pass filter for filtering the output signals of said first frequency converter; a second frequency converter for converting the frequency of the output signals of said first band-pass filter by using output signals of said second phase shifter; and a second band-pass filter for filtering the output of said second frequency converter and changing these output signals into output signals of each of said sixth and eleventh means.

11. The amplitude equalizer claimed in claim 7; wherein each of said sixth and eleventh means comprises a first local oscillator; a first phase shifter for giving the first phase shift determined by the control signals to the output signal of said first local oscillator; a first frequency converter for converting the frequency of the input signals applied to each of said sixth and eleventh means by using output of said first local oscillator; a first band-pass filter for filtering the output signal of said first frequency converter; a second frequency converter for converting the frequency of the output signals of said first band-pass filter by using the output signals of said first phase shifter; and a second band-pass filter for filtering the output signals of said second frequency converter and changing them into output signals of each of said the sixth and eleventh means.

12. The amplitude equalizer claimed in claim 11, wherein said first phase shifter comprises: a first gate circuit responsive to said control signals for producing first complementary signals; a second gate circuit responsible to the output signals of said first local oscillator for producing second complementary signals; a first NAND gate responsive to one of said first complementary signals and one of said second complementary signals; a second NAND gate responsive to the other of said first complementary signals and the other of said second complementary signals; and a third NAND gate responsive to the output signals of said first and second NAND circuit for changing them into output signals of said first phase shifter.

* * * * *